United States Patent
Li

(10) Patent No.: US 11,921,375 B2
(45) Date of Patent: Mar. 5, 2024

(54) MINI-LED BACKLIGHT MODULE, MANUFACTURING METHOD THEREOF, AND DISPLAY PANEL

(71) Applicant: Shenzhen China Star Optoelectronics Semiconductor Display Technology Co., Ltd., Guangdong (CN)

(72) Inventor: Zhuhui Li, Guangdong (CN)

(73) Assignee: Shenzhen China Star Optoelectronics Semiconductor Display Technology Co., Ltd., Shenzhen (CN)

(*) Notice: Subject to any disclaimer, the term of this patent is extended or adjusted under 35 U.S.C. 154(b) by 704 days.

(21) Appl. No.: 17/049,034

(22) PCT Filed: Aug. 4, 2020

(86) PCT No.: PCT/CN2020/106762
§ 371 (c)(1),
(2) Date: Oct. 20, 2020

(87) PCT Pub. No.: WO2022/007073
PCT Pub. Date: Jan. 13, 2022

(65) Prior Publication Data
US 2023/0143518 A1    May 11, 2023

(30) Foreign Application Priority Data
Jul. 10, 2020 (CN) .......................... 202010663404.4

(51) Int. Cl.
G02F 1/1335    (2006.01)
G02F 1/13357   (2006.01)

(52) U.S. Cl.
CPC .. *G02F 1/133612* (2021.01); *G02F 1/133603* (2013.01); *G02F 1/133608* (2013.01); *G02F 1/133611* (2013.01)

(58) Field of Classification Search
CPC ........ H05B 45/10; H05B 45/30; H05B 45/40; H05B 45/44; H05B 45/46; H05B 45/50;
(Continued)

(56) References Cited

U.S. PATENT DOCUMENTS 10,634,949 B1    4/2020  den Boer et al.
11,000,911 B2 *  5/2021  Yang ................... H05K 3/3494
(Continued)

FOREIGN PATENT DOCUMENTS

CN    103688373    3/2014
CN    107910322    4/2018
(Continued)

*Primary Examiner* — Jason M Crawford

(57) ABSTRACT

A mini light-emitting diode (mini-LED) backlight module, a manufacturing method thereof, and a display panel are provided. A plurality of backlight partitions are defined on a flexible substrate to improve brightness uniformity. A plurality of mini-LEDs arranged in an array in each of the backlight partitions are formed into parallel modules, so that a driving voltage and current of the backlight module can be within an appropriate range. The flexible substrate is further arranged with a first metal pattern, and signals can be independently input to each of the mini-LEDs through each of first sub-metal patterns, reducing metal trace resistance of the backlight module, and further improving brightness uniformity of the backlight module.

19 Claims, 5 Drawing Sheets

(58) Field of Classification Search
CPC ........ H05B 45/52; H05B 45/54; H05B 47/10; H05B 47/155; H05B 47/20; H05B 47/21; G02F 1/133603; G02F 1/133608; G02F 1/133611; G02F 1/133612
See application file for complete search history.

(56) References Cited

U.S. PATENT DOCUMENTS

| | | | |
|---|---|---|---|
| 11,588,085 B2* | 2/2023 | Ban | H01L 33/12 |
| 2009/0161038 A1* | 6/2009 | Toyama | G02F 1/133603 |
| | | | 257/E33.001 |
| 2012/0113328 A1* | 5/2012 | Takeshima | H01L 33/647 |
| | | | 257/88 |
| 2014/0132891 A1* | 5/2014 | Tohyama | H05K 1/0204 |
| | | | 315/297 |
| 2016/0377919 A1* | 12/2016 | Ning | G02F 1/133514 |
| | | | 349/42 |
| 2020/0074917 A1* | 3/2020 | Li | G09G 3/3426 |
| 2020/0218379 A1 | 7/2020 | Lee et al. | |
| 2020/0357846 A1* | 11/2020 | Lee | H01L 25/0655 |
| 2021/0132444 A1* | 5/2021 | Watanabe | G02F 1/133603 |
| 2021/0223630 A1* | 7/2021 | Ma | H01L 33/60 |
| 2022/0005989 A1* | 1/2022 | Ban | H01L 33/12 |
| 2022/0005990 A1* | 1/2022 | Su | H01L 25/18 |
| 2022/0244597 A1* | 8/2022 | Tong | G02F 1/133601 |
| 2023/0028746 A1* | 1/2023 | Yang | G09G 3/34 |
| 2023/0143518 A1* | 5/2023 | Li | G02F 1/133612 |
| | | | 362/97.3 |
| 2023/0261035 A1* | 8/2023 | Sun | G02F 1/133603 |
| | | | 362/97.1 |

FOREIGN PATENT DOCUMENTS

| | | |
|---|---|---|
| CN | 108535917 | 9/2018 |
| CN | 108828841 | 11/2018 |
| CN | 109116626 | 1/2019 |
| CN | 110824766 | 2/2020 |
| CN | 110972495 | 4/2020 |

* cited by examiner providing a flexible substrate, defining the flexible substrate into a plurality of backlight partitions, wherein each of the backlight partitions includes at least one backlight sub-region — S1 forming a first metal pattern on the flexible substrate, wherein the first metal pattern is defined into a plurality of first sub-metal patterns, and each of the first sub-metal patterns is arranged corresponding to one of the backlight partitions; and, mounting a plurality of mini-LEDs correspondingly on the flexible substrate, wherein the mini-LEDs positioned on each of the backlight sub-region are arranged in an array. Wherein, in each of the backlight sub-region, all the mini-LEDs positioned in a same row are connected in series to form a series branch, multiple series branches are connected in parallel to form a parallel module, and a plurality of the parallel modules are electrically connected through the first sub-metal patterns — S2

FIG. 5

MINI-LED BACKLIGHT MODULE, MANUFACTURING METHOD THEREOF, AND DISPLAY PANEL

RELATED APPLICATIONS

This application is a National Phase of PCT Patent Application No. PCT/CN2020/106762 having International filing date of Aug. 4, 2020, which claims the benefit of priority of Chinese Patent Application No. 202010663404.4 filed on Jul. 10, 2020. The contents of the above applications are all incorporated by reference as if fully set forth herein in their entirety.

FIELD AND BACKGROUND OF THE INVENTION

The present application relates to the field of display technologies, and in particular to a mini light-emitting diode (mini-LED) backlight module, a manufacturing method thereof, and a display panel.

With development of display panel technologies, people are increasingly pursuing lighter, thinner, and larger flexible displays. Traditional thin film transistor liquid crystal displays (TFT-LCDs) use a glass substrate and a rigid backlight with a fixed curvature, which cannot meet flexible display requirements. Since organic light-emitting diodes (OLEDs) are self-luminous devices and have no liquid crystals, they are relatively easy to realize flexible displays. However, OLEDs have shortcomings of short service life, poor reliability, and high cost, so they cannot realize large-size flexible displays. Therefore, flexible LCDs came into being, inheriting advantages of TFT-LCD and OLED, but also having advantages of drop resistance, light weight, and flexibility. However, in order to further reduce weight and thickness of flexible LCDs, it is necessary to further reduce weight and thickness of backlight modules of the flexible LCDs.

Technical Problem

Mini light-emitting diode (mini-LED) backlight modules are regarded as a specific way to reduce the weight and thickness of flexible LCD backlight modules due to their light weight, thinness, high color gamut, and high contrast ratio. However, in the conventional art, multiple mini-LEDs are generally connected to each other directly in series or directly in parallel. However, the multiple mini-LEDs connected to each other directly in series will cause an excessive driving voltage, and the multiple mini-LEDs connected to each other directly in parallel will cause an excessive driving current. At the same time, a brightness uniformity of the backlight module will be poor. Therefore, the conventional mini-LED backlight modules have problems of high driving voltage, high driving current, poor brightness uniformity, and poor reliability.

SUMMARY OF THE INVENTION

Technical Solutions

In order to solve problems of high driving voltage, high driving current, and poor brightness uniformity existing in conventional mini light-emitting diode (mini-LED) backlight modules, the present application provides a mini-LED backlight module, a manufacturing method thereof, and a display panel.

In a first aspect, the present application provides a mini-LED backlight module, the mini-LED backlight module includes a flexible substrate, and a first metal pattern and a plurality of mini-LEDs arranged on the flexible substrate, wherein the flexible substrate is provided with a plurality of backlight partitions, the first metal pattern is defined into a plurality of first sub-metal patterns, and each of the first sub-metal patterns is arranged corresponding to one of the backlight partitions; wherein each of the backlight partitions includes at least one backlight sub-region, each of the backlight sub-region is provided with a plurality of the mini-LEDs arranged in an array; wherein in each of the backlight sub-region, all of the mini LEDs positioned in a same row are connected in series to form a series branch, multiple series branches are connected in parallel to form a parallel module; and wherein some of the parallel modules are electrically connected through the first sub-metal patterns, and an external input signal is input to each of the mini-LEDs in the backlight sub-region through each of the first sub-metal patterns.

In some embodiments, each of the first sub-metal patterns includes a first anode trace and a first cathode trace, both ends of the parallel module are electrically connected to the first anode trace and the first cathode trace, respectively.

In some embodiments, each of the first sub-metal patterns further includes a plurality of connection lines, and all of the mini-LEDs in each of the series branches are connected in series through the connection lines.

In some embodiments, each of the backlight partitions includes one of the backlight sub-region, the first anode trace and the first cathode trace are straight traces, and are respectively distributed on both sides of each of the backlight partitions.

In some embodiments, each of the backlight partitions includes two of the backlight sub-regions, the two of the backlight sub-regions are arranged side by side, and the both ends of the parallel module of each of the backlight partitions are electrically connected to the first anode trace and the first cathode trace, respectively.

In some embodiments, the two of the backlight sub-regions are a first backlight sub-region and a second backlight sub-region; the first anode trace is of an inverted U-shape, the first cathode trace is of a U-shape, the first anode trace is arranged around the mini-LEDs positioned in the first backlight sub-region, the first cathode trace is arranged around the mini-LEDs positioned in the second backlight sub-region; the first anode trace and the first cathode trace are arranged alternately, a portion where the first anode trace and the first cathode trace are close to each other is positioned between the first backlight sub-region and the second backlight sub-region; and the both ends of the parallel module in the first backlight sub-region and the second backlight sub-region are electrically connected to the first anode and the first cathode nearby, respectively.

In some embodiments, a second metal pattern is further provided on the flexible substrate, the second metal pattern includes a plurality of second sub-metal patterns, and each of the second sub-metal patterns is arranged corresponding to one of the backlight partitions; each of the second sub-metal patterns includes a second anode trace and a second cathode trace; the first anode trace of one of the first sub-metal patterns is electrically connected to corresponding the second anode trace of one of the second sub-metal patterns, and the first cathode trace of the one of the first sub-metal patterns is electrically connected to corresponding the second cathode trace of the one of the second sub-metal patterns.

In some embodiments, the first metal pattern further includes an anode bus line, the second metal pattern further includes a cathode bus line; each of the second anode trace of each of the second sub-metal patterns is electrically connected to the anode bus line, and each of the second cathode trace of each of the second sub-metal patterns is electrically connected to the cathode bus line.

In some embodiments, the second metal pattern and the first metal pattern are arranged in different layers.

In some embodiments, the second metal pattern is positioned under the first metal pattern.

In a second aspect, the present application further provides a method of manufacturing the mini light-emitting diode (mini-LED) backlight module, the method of manufacturing the mini-LED backlight module including following steps:

providing a flexible substrate, defining the flexible substrate into a plurality of backlight partitions, wherein each of the backlight partitions includes at least one backlight sub-region;

forming a first metal pattern on the flexible substrate, wherein the first metal pattern is defined into a plurality of first sub-metal patterns, and each of the first sub-metal patterns is arranged corresponding to one of the backlight partitions; and, mounting a plurality of mini-LEDs correspondingly on the flexible substrate, wherein the mini-LEDs positioned on each of the at least one backlight sub-region are arranged in an array;

wherein in each of the backlight sub-region, all of the mini-LEDs positioned in a same row are connected in series to form a series branch, multiple series branches are connected in parallel to form a parallel module, and a plurality of the parallel modules are electrically connected through the first sub-metal patterns.

In some embodiments, each of the first sub-metal patterns includes a first anode trace and a first cathode trace, both ends of the parallel module are electrically connected to the first anode trace and the first cathode trace, respectively.

In some embodiments, each of the first sub-metal patterns further includes a plurality of connection lines, and all of the mini-LEDs in each of the series branches are connected in series through the connection lines.

In some embodiments, each of the backlight partitions includes one of the backlight sub-region, the first anode trace and the first cathode trace are straight traces, and are respectively distributed on both sides of each of the backlight partitions.

In some embodiments, each of the backlight partitions includes two of the backlight sub-regions, the two of the backlight sub-regions are arranged side by side, and the both ends of the parallel module of each of the backlight partitions are electrically connected to the first anode trace and the first cathode trace, respectively.

In some embodiments, the two of the backlight sub-regions are a first backlight sub-region and a second backlight sub-region; the first anode trace is of an inverted U-shape, the first cathode trace is of a U-shape, the first anode trace is arranged around the mini-LEDs positioned in the first backlight sub-region, the first cathode trace is arranged around the mini-LEDs positioned in the second backlight sub-region; the first anode trace and the first cathode trace are arranged alternately, a portion where the first anode trace and the first cathode trace are close to each other is positioned between the first backlight sub-region and the second backlight sub-region; and the both ends of the parallel module in the first backlight sub-region and the second backlight sub-region are electrically connected to the first anode and the first cathode nearby, respectively.

In some embodiments, before the step of forming the first metal pattern on the flexible substrate, the method of manufacturing the mini-LED backlight module further including following steps:

disposing a second metal pattern on the flexible substrate, wherein the second metal pattern is defined into a plurality of second sub-metal patterns, to make each of the second sub-metal patterns arranged corresponding to one of the backlight partitions; and wherein each of the second sub-metal patterns includes a second anode trace and a second cathode trace, the first anode trace of one of the first sub-metal patterns is electrically connected to corresponding the second anode trace of one of the second sub-metal patterns, and the first cathode trace of the one of the first sub-metal patterns is electrically connected to corresponding the second cathode trace of the one of the second sub-metal patterns.

In some embodiments, the first metal pattern further includes an anode bus line, the second metal pattern further includes a cathode bus line; each of the second anode trace of each of the second sub-metal patterns is electrically connected to the anode bus line, and each of the second cathode trace of each of the second sub-metal patterns is electrically connected to the cathode bus line.

In a third aspect, the present application also provides a display panel, including the mini-LED backlight module as described above.

Beneficial Effect

A mini-LED backlight module, a manufacturing method thereof, and a display panel are provided in the present application, in which the flexible substrate is defined into several backlight partitions according to actual backlight requirements. Therefore, compared with arranging mini-LEDs directly on the flexible substrate without backlight partitioning, a brightness uniformity of the backlight module can be improved. In addition, because several mini-LEDs arranged in an array in each of backlight sub-region are arranged in series and parallel to form a parallel module, therefore, compared with several mini-LEDs directly connected in series, a driving voltage is reduced, and compared with several mini-LEDs directly connected in parallel, a driving current is reduced, so that the driving voltage and the driving current of the backlight module can be within an appropriate range. Meanwhile, the flexible substrate is also arranged with the first metal pattern, each of the first sub-metal patterns is arranged corresponding to one of the backlight partitions, some of the parallel modules are electrically connected through the first sub-metal patterns, and an external input signal is independently input to each of the mini-LEDs in the backlight sub-region through each of the first sub-metal patterns. In this way, a metal trace resistance of the backlight module can be reduced, thereby reducing a voltage drop (IR drop) effect, and further improving the brightness uniformity of the backlight module.

BRIEF DESCRIPTION OF THE SEVERAL VIEWS OF THE DRAWINGS

FIG. 5 is a schematic flowchart of a method of manufacturing the mini-LED backlight module according to an embodiment of the present application.

DESCRIPTION OF SPECIFIC EMBODIMENTS OF THE INVENTION

In order to illustrate the technical solutions of the present disclosure or the related art in a clearer manner, the drawings desired for the present disclosure or the related art will be described hereinafter briefly. It should be understood that the specific embodiments described here are only used to explain the application, and not used to limit the application.

Figure 1:
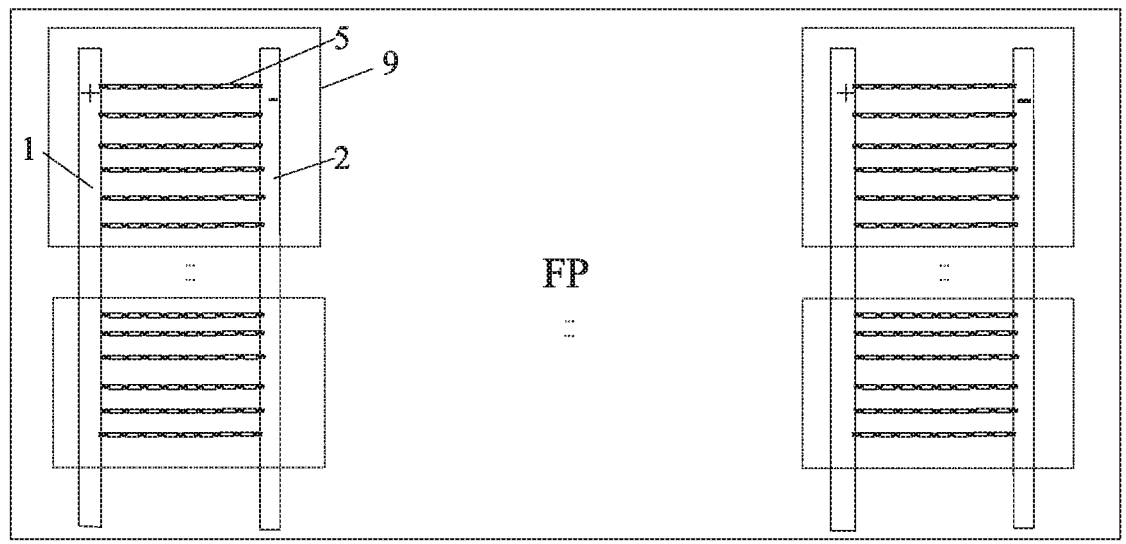
FIG. 1 is a schematic structural diagram of a mini light-emitting diode (mini-LED) backlight module according to an embodiment of the present application.
Figure 2:
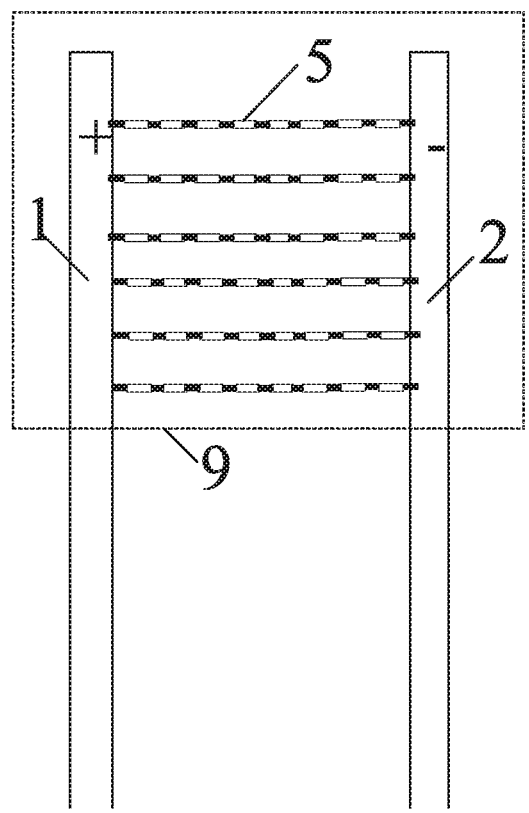
FIG. 2 is a schematic structural diagram of a backlight partition of the mini-LED backlight module according to an embodiment of the present application.

FIG. 1 is a schematic structural diagram of a mini light-emitting diode (mini-LED) backlight module according to an embodiment of the present application, and FIG. 2 is a schematic diagram of a backlight partition of the mini-LED backlight module according to an embodiment of the present application. Refer to FIG. 1 and FIG. 2, the mini-LED backlight module according to the present application includes a flexible substrate FP, a first metal pattern (excluding solid lines that represent mini-LEDs in the figure) and a plurality of mini-LEDs are arranged on the flexible substrate. The flexible substrate is provided with a plurality of backlight partitions 9. The first metal pattern is defined into a plurality of first sub-metal patterns (solid lines in each backlight partition 9 in the figure), and each of the first sub-metal patterns is arranged corresponding to one of the backlight partitions 9. Each of the backlight partitions 9 includes at least one backlight sub-region (in FIG. 1 and FIG. 2, each backlight partition 9 includes only one backlight sub-region as an example), and each of the backlight sub-region is provided with a plurality of the mini-LEDs arranged in an array (a small rectangle in the figure is a mini-LED). In each of the backlight sub-region, all of the mini LEDs positioned in a same row are connected in series to form a series branch, and multiple series branches are connected in parallel to form a parallel module. Some of the parallel modules are electrically connected through the first sub-metal patterns, and an external input signal is input to each of the mini-LEDs in the backlight sub-region through each of the first sub-metal patterns.

Specifically, a plurality of backlight partitions 9 are provided on the flexible substrate, and each of the backlight partitions 9 includes at least one backlight sub-region. In each of the backlight sub-region, several mini-LEDs are arranged in an array of m rows by n columns, n mini-LEDs in each row are connected in series to form a series branch, and m series branches are connected in parallel to form a parallel module, where m and n are positive integers (m=6 and n=8 as example in FIG. 1 and FIG. 2).

In addition, the first metal pattern is also arranged on the flexible substrate, and a distribution position of each of the first sub-metal patterns of the first metal pattern corresponds to a distribution position of one of the backlight partitions 9. The parallel modules consisting of several LEDs in each of the backlight sub-region realize electrical connection through the first sub-metal pattern corresponding to one of the backlight partitions 9 to which each of the backlight sub-region belongs, and the external input signal is input into each of the mini-LED in each of the backlight sub-regions by a first sub-metal pattern corresponding to one of the backlight partitions 9 to which the each of the backlight sub-region belongs.

The mini-LED backlight module according to the present application has several backlight partitions on the flexible substrate according to actual backlight requirements, therefore, compared with arranging mini-LEDs directly on the flexible substrate without backlight partitioning, a brightness uniformity of the backlight module can be improved. In addition, because several mini-LEDs arranged in an array in each of backlight sub-region are arranged in series and parallel to form a parallel module, therefore, compared with several mini-LEDs directly connected in series, a driving voltage is reduced, and compared with several mini-LEDs directly connected in parallel, a driving current is reduced, so that the driving voltage and the driving current of the backlight module can be within an appropriate range. Meanwhile, the flexible substrate is also arranged with the first metal pattern, each of the first sub-metal patterns is arranged corresponding to one of the backlight partitions, some of the parallel modules are electrically connected through the first sub-metal patterns, and an external input signal is independently input to each of the mini-LEDs in the backlight sub-region through each of the first sub-metal patterns. In this way, a metal trace resistance of the backlight module can be reduced, thereby reducing a voltage drop (IR drop) effect, and further improving the brightness uniformity of the backlight module.

Based on the foregoing embodiment, refer to FIG. 1 and FIG. 2, each of the first sub-metal patterns includes a first anode trace 1 and a first cathode trace 2, and both ends of the parallel module are electrically connected to the first anode trace 1 and the first cathode trace 2, respectively. Taking as an example that each of the backlight partitions 9 includes only one backlight sub-region, the first anode trace 1 and the first cathode trace 2 are straight traces, and are distributed on both sides of one backlight partition, respectively.

It should be noted that the first anode trace 1 and the first cathode trace 2, as well as a second anode trace 3 and a second cathode trace 4 in the following embodiments, are planar regions on the flexible substrate in solid or dashed lines in the figures, respectively. The solid and dashed lines in the figures indicate line widths of traces.

Specifically, according to an arrangement of the first metal patterns, the first anode traces 1 of each of the first sub-metal patterns are directly or indirectly electrically connected to each other, and the first cathode traces of each of the first sub-metal pattern 2 are also directly or indirectly electrically connected to each other. A positive signal of the external input signal is electrically connected to the first anode trace 1, and a negative signal of the external input signal is electrically connected to the first cathode trace 2. Thus, the external input signal is input to each of the backlight sub-regions through the first anode trace 1 and the first cathode trace 2.

Furthermore, the both ends of the parallel module consisting of several mini-LEDs connected to each other in a series and parallel combination are respectively electrically connected to the first anode trace 1 and the first cathode trace 2, that is, a first mini-LED in each row of n mini-LEDs is electrically connected to the first anode trace 1, and an n-th mini-LED is electrically connected to the first cathode trace 2, so that the external input signal input to each of the backlight sub-region is further input to each of the mini-LED in each of the backlight sub-region.

The present application uses the above-mentioned specific connection method to input the external input signal to each of the mini-LED in each of the backlight sub-region through the first anode trace 1 and the second anode trace 2, thereby controlling each of the mini-LED.

It should be noted that, referring to FIG. 1 and FIG. 2, each of the first sub-metal pattern further includes a plurality of connection lines 5, and all of the mini-LEDs in each of the series branches are connected in series through the connection lines, respectively.

It is understandable that the several mini-LEDs of the backlight module are not limited to the arrangement in FIG. 1 and FIG. 2, and can also be arranged reasonably according to the driving voltage and the driving current required by actual needs, so as to further optimize a circuitry design of each of the backlight partitions 9 to further improve a display effect.

Based on the foregoing embodiment, taking each of the backlight partitions 9 including two backlight partitions as an example, the two backlight partitions are arranged side by side, and both ends of the parallel module in each of the backlight sub-region are electrically connected to the first anode trace 1 and the first cathode trace 2, respectively.

Specifically, two backlight sub-regions are arranged side by side to form a backlight partition 9, and the both ends of the parallel module consisting of several mini-LEDs in each of the backlight sub-region connected to each other in a series and parallel combination are still connected to the first anode trace 1 and the first cathode trace 2, respectively. As a result, the external input signal is independently input to each of the mini-LED in the two backlight sub-regions of each of the backlight partition 9 through the first anode trace 1 and the first cathode trace 2, respectively.

Figure 3:
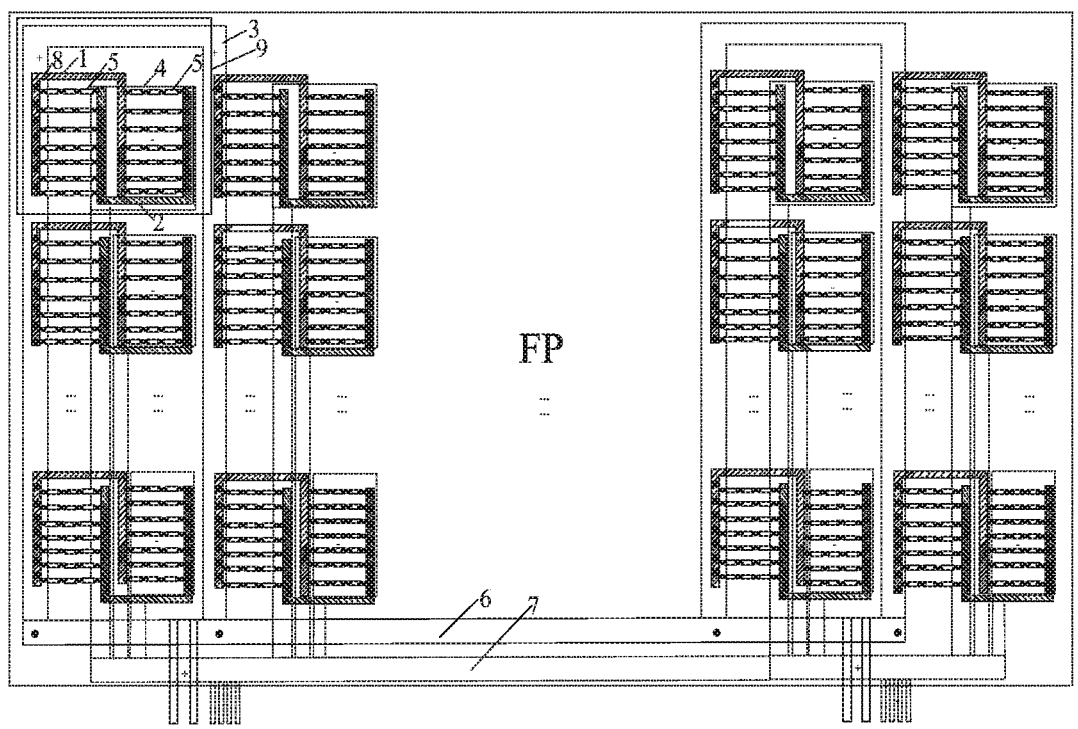
FIG. 3 is another schematic structural diagram of the mini-LED backlight module according to an embodiment of the present application.
Figure 4:
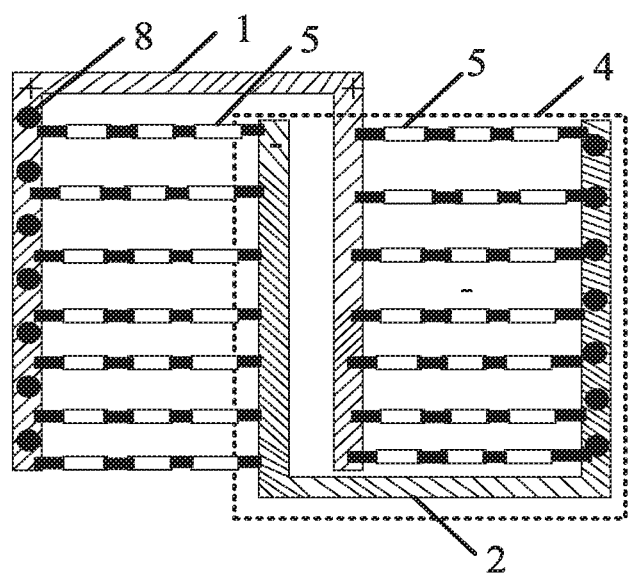
FIG. 4 is another schematic structural diagram of the backlight partition of the mini-LED backlight module according to an embodiment of the present application.

Based on the foregoing embodiment, FIG. 3 is another structural schematic diagram of the mini-LED backlight module according to an embodiment of the present application, and FIG. 4 is another structural schematic diagram of the backlight partition of the mini-LED backlight module according to an embodiment of the present application. Referring to FIG. 3 and FIG. 4, the two backlight partitions arranged side by side are a first backlight sub-region (consisting of the first anode trace 1 in FIG. 3 and FIG. 4, and several mini-LEDs in left half of its surrounding) and a second backlight sub-region (consisting of the first cathode trace 2 in FIG. 3 and FIG. 4, and several mini-LEDs in right half of its surrounding). Therebetween, the first anode trace 1 is of an inverted U-shape, the first cathode trace 2 is of a U-shape, the first anode trace 1 is arranged around the mini-LEDs positioned in the first backlight sub-region, and the first cathode trace 2 is arranged around the mini-LEDs positioned in the second backlight sub-region. The first anode trace 1 and the first cathode trace 2 are arranged alternately, that is, a leg portion of the inverted U-shaped first anode trace 1 and a leg portion of the U-shaped first cathode trace 2 arranged close to each other are positioned inside U-shaped recesses of each other, respectively, and a portion where the first anode trace 1 and the first cathode trace 2 are close to each other is positioned between the first backlight sub-region and the second backlight sub-region. The both ends of the parallel module in the first backlight sub-region and the second backlight sub-region are electrically connected to the first anode 1 and the first cathode 2 nearby, respectively.

Specifically, in the first backlight sub-region and the second backlight sub-region, the first mini-LED in each row of n mini-LEDs is electrically connected to the first anode trace 1, and the n-th mini-LED is electrically connected to the first cathode trace 2; and n mini-LEDs in a same row are connected in series to form a series branch, and m series branches are connected in parallel to form a parallel module. Thus, the mini-LEDs arranged in an array of m rows by n columns are arranged in each of the backlight sub-region (m=7 and n=8 are taken as examples in FIG. 3 and FIG. 4).

According to another structure of the above mini-LED backlight module, the present application divides the backlight partition into two backlight sub-regions arranged side by side and staggered. As a result, several mini-LEDs in each of the backlight sub-region are distributed along with distribution positions of the two backlight sub-regions, thereby further improving the brightness uniformity of the backlight module.

Based on the foregoing embodiment, referring to FIG. 3 and FIG. 4, the flexible substrate is also provided with a second metal pattern (shown with dotted line in figures), and the second metal pattern includes a plurality of second sub-metal patterns (shown with dotted line in each backlight partition 9 in the figure). Each of the second sub-metal patterns corresponds to one of the backlight partitions, each of the second sub-metal patterns includes a second anode trace 3 and a second cathode trace 4, the first anode trace 1 of the first sub-metal pattern is electrically connected to the second anode trace 3 of a corresponding second sub-metal pattern, and the first cathode trace 2 of the first sub-metal pattern is electrically connected to the second cathode trace 4 of a corresponding second sub-metal pattern.

Specifically, the positive signal of the external input signal is transmitted to each of the mini-LED in each of the backlight sub-region of each of the backlight partitions 9 from the second anode trace 3 via the first anode trace 1, and the negative signal of the external input signal is transmitted to each of the mini-LED in each of the backlight sub-region of each of the backlight partitions 9 from the second cathode trace 4 via the first cathode trace 2, thereby transmitting the external input signal to each of the mini-LED.

In the present application, the second metal pattern is further provided on a basis of the first metal pattern, and the external input signal is transmitted to the first metal pattern via the second metal pattern, and then is inputted to each of the mini-LED in each of the backlight sub-region of each of the backlight partitions 9 via the first metal pattern, respectively. The first metal pattern and the second metal pattern perform signal transmission independently, which can reduce the metal trace resistance of the backlight module, thereby reducing the IR drop effect, and further improving the brightness uniformity of the backlight module.

Furthermore, referring to FIG. 3, the first metal pattern further includes an anode bus line 6, the second metal pattern further includes a cathode bus line 7, the second anode trace 3 of each of the second sub-metal pattern is electrically connected to the anode bus line 6, the second cathode trace 4 of each of the second sub-metal pattern is electrically connected to the cathode bus line 7. In this way, the positive signal of the external input signal is transmitted to the second anode trace 3 via the anode bus line 6, and the negative signal of the external input signal is transmitted to the second cathode trace 4 via the cathode bus line 7.

Summarizing the foregoing embodiments, the positive signal of the external input signal is transmitted to the second anode trace 3 via the anode bus line 6, and then is inputted to each of the mini-LED in each of the backlight sub-region of each of the backlight partitions 9 from the second anode trace 3 via the first anode trace 1. The negative signal of the external input signal is transmitted to the second cathode trace 4 via the cathode bus line 7, and then is transmitted to each of the mini-LED in each of the backlight sub-region of each of the backlight partitions 9 from the second cathode trace 4 via the first cathode trace 2, therefore, the external input signal is transmitted to each of the mini-LED.

Based on the foregoing embodiment, the second metal pattern and the first metal pattern are arranged in different layers, that is, the first anode trace 1, the first cathode trace 2, and the anode bus line 6 of the first metal pattern are arranged on a first layer, the second anode trace 3, the second cathode trace 4, and the cathode bus line 7 of the second metal pattern are arranged on a second layer, and the first layer and the second layer are arranged in two different layers.

In the present application, by arranging the two metal patterns of the first metal pattern and the second metal pattern, the external input signal is transmitted to each of the mini-LED in each of the backlight sub-region of each of the backlight partitions 9 from the second anode trace 3 and the second cathode trace 4 of the second metal pattern via the anode trace 1 and the first cathode trace 2 of the first metal pattern. As a result, the external input signal is independently input to each of the mini-LED in each of the backlight sub-region of each of the backlight partition 9, and the two layers of metal patterns are arranged in different layers, so as not to interfere with each other, so as to facilitate a trace arrangement.

Furthermore, since the mini-LEDs are directly electrically connected to the first metal pattern, the second metal pattern can be arranged under the first metal pattern, that is, the second layer is positioned under the first layer, so that the mini-LEDs can be mounted on an upper level of the backlight module to facilitate an installation of mini-LEDs.

It should be noted that, referring to FIG. 1, FIG. 2, FIG. 3, and FIG. 4, the first anode trace 1 and the second anode trace 3, the first cathode trace 2 and the second cathode trace 4, and the second anode trace 3 and the anode bus line 6 are electrically connected through a plurality of connection holes 8, respectively. In addition, since the second cathode trace 4 and the cathode bus line 7 are both provided on the second layer, the second cathode trace 4 is directly electrically connected to the cathode bus line 7, and do not need to be electrically connected through a connection hole.

It is understandable that the mini-LED backlight module according to the embodiments of the present application is a direct type backlight module, and several backlight partitions 9 can be arranged in an array on the flexible substrate. Therefore, dies of mini-LEDs in each of the backlight sub-region of each of the backlight partition 9 are evenly arranged behind a display panel as a light source, so that backlight is evenly transmitted to an entire screen, and a more delicate and lifelike display effect is achieved.

FIG. 5 is a schematic flowchart of a method of manufacturing the mini-LED backlight module according to an embodiment of the present application. Referring to FIG. 1, FIG. 2, and FIG. 5, an embodiment of the present application further provides a method of manufacturing the mini-LED backlight module. The method of manufacturing the mini-LED backlight module includes following steps.

S1, providing a flexible substrate FP, defining the flexible substrate into a plurality of backlight partitions 9, wherein each of the backlight partitions 9 includes at least one backlight sub-region.

Specifically, according to actual backlight requirements, the backlight partitions 9 are defined on the flexible substrate, and each of the backlight partitions 9 includes at least one backlight sub-region. Each of the backlight sub-regions is configured to limit an installation range of several mini-LEDs on the flexible substrate.

S2, forming a first metal pattern on the flexible substrate, wherein the first metal pattern is defined into a plurality of first sub-metal patterns, and each of the first sub-metal patterns is arranged corresponding to one of the backlight partitions 9; and, mounting a plurality of mini-LEDs correspondingly on the flexible substrate, wherein the mini-LEDs positioned on each of the backlight sub-region are arranged in an array. Wherein, in each of the backlight sub-region, all of the mini-LEDs positioned in a same row are connected in series to form a series branch, multiple series branches are connected in parallel to form a parallel module, and a plurality of the parallel modules are electrically connected through the first sub-metal patterns.

Specifically, in each of the backlight sub-region, n mini-LEDs in each row are connected in series to form a series branch, and m series branches are connected in parallel to form a parallel module, where m and n are positive integers (m=6 and n=8 as example in FIG. 1 and FIG. 2). Thus, m rows by n columns of mini-LEDs are arranged in each of the backlight sub-region. The first metal pattern is further arranged on the flexible substrate, and the distribution position of each of the first sub-metal patterns of the first metal pattern corresponds to the distribution position of one of the backlight partitions 9. The parallel modules consisting of several LEDs in each of the backlight sub-region realize electrical connection through the first sub-metal pattern corresponding to one of the backlight partitions 9 to which each of the backlight sub-region belongs, and the external input signal is input into each of the mini-LED in each of the backlight sub-regions by the first sub-metal pattern corresponding to one of the backlight partitions 9 to which the each of the backlight sub-region belongs.

In the method of manufacturing the mini-LED backlight module provided in the present application, since a plurality of backlight partitions are defined on the flexible substrate according to actual backlight requirements, therefore, compared with arranging mini-LEDs directly on the flexible substrate without backlight partitioning, a brightness uniformity of the backlight module can be improved. In addition, because several mini-LEDs arranged in an array in each of backlight sub-region are arranged in series and parallel to form a parallel module, therefore, compared with several mini-LEDs directly connected in series, a driving voltage is reduced, and compared with several mini-LEDs directly connected in parallel, a driving current is reduced, so that the driving voltage and the driving current of the backlight module can be within an appropriate range. Meanwhile, the flexible substrate is also arranged with the first metal pattern, each of the first sub-metal patterns is arranged corresponding to one of the backlight partitions, some of the parallel modules are electrically connected through the first sub-metal patterns, and an external input signal is independently input to each of the mini-LEDs in the backlight sub-region through each of the first sub-metal patterns. In this way, a metal trace resistance of the backlight module can be reduced, thereby reducing a voltage drop (IR drop) effect, and further improving the brightness uniformity of the backlight module.

For the method of manufacturing the mini-LED backlight module in FIG. 1 and FIG. 2, it corresponds to the structure and beneficial effects of the mini-LED backlight module in FIG. 1 and FIG. 2. Since the foregoing embodiment has described the structure and beneficial effects of the mini-LED backlight module in FIG. 1 and FIG. 2 in detail, they will not be repeated here.

Referring to FIG. 3, FIG. 4, and FIG. 5, before the step of "forming the first metal pattern on the flexible substrate", the method of manufacturing the mini-LED backlight module further includes following step.

Disposing a second metal pattern on the flexible substrate, wherein the second metal pattern is defined into a plurality of second sub-metal patterns, to make each of the second sub-metal patterns arranged corresponding to one of the backlight partitions. Wherein, each of the second sub-metal patterns includes a second anode trace and a second cathode trace, the first anode trace of one of the first sub-metal patterns is electrically connected to corresponding the second anode trace of one of the second sub-metal patterns, and the first cathode trace of the one of the first sub-metal patterns is electrically connected to corresponding the second cathode trace of the one of the second sub-metal patterns.

In the present application, the second metal pattern is further provided on the basis of the first metal pattern, and the external input signal is transmitted to the first metal pattern via the second metal pattern, and then is inputted to each of the mini-LED in each of the backlight sub-region of each of the backlight partitions 9 via the first metal pattern, respectively. The first metal pattern and the second metal pattern perform signal transmission independently, which can reduce the metal trace resistance of the backlight module, thereby reducing the IR drop effect, and further improving the brightness uniformity of the backlight module.

For the method of manufacturing another structure of the mini-LED backlight module in FIG. 3 and FIG. 4, it corresponds to the structure and beneficial effects of the mini-LED backlight module in FIG. 3 and FIG. 4. Since the foregoing embodiment has described the structure and beneficial effects of the mini-LED backlight module in FIG. 3 and FIG. 4 in detail, they will not be repeated here.

Based on the foregoing embodiment, referring to FIG. 3 and FIG. 4, the method of manufacturing the mini-LED backlight module specifically includes following steps.

Figure 6:
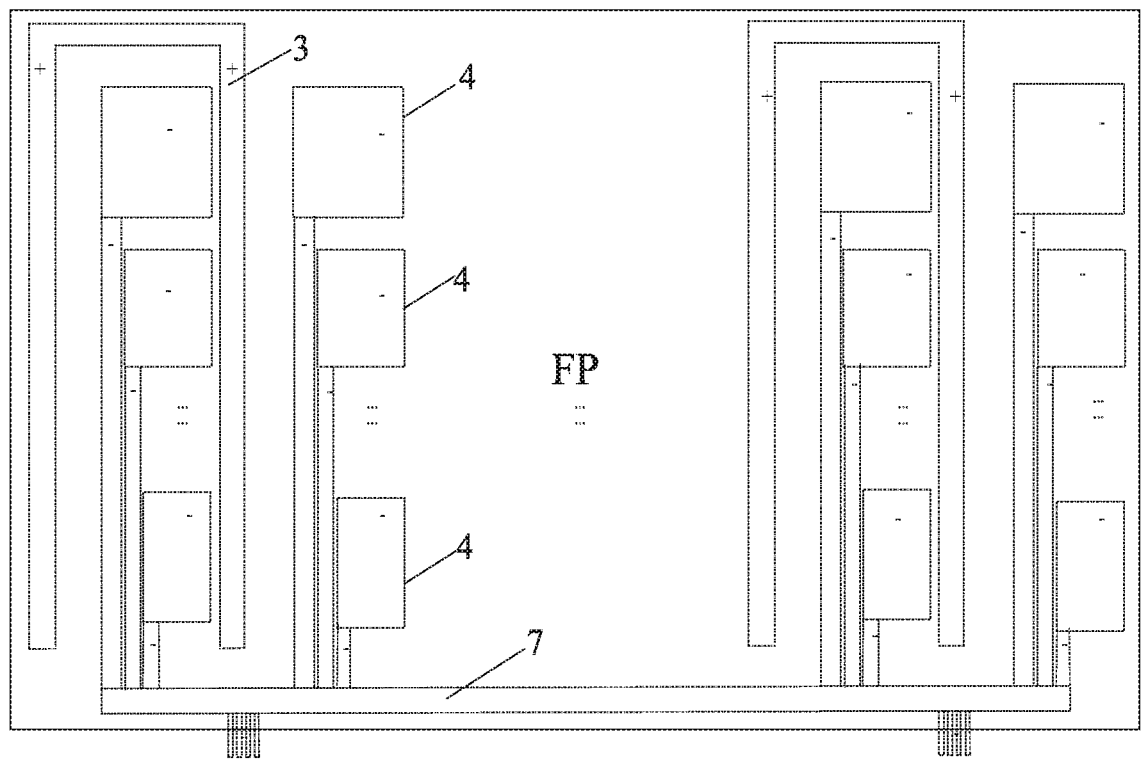
FIG. 6(a) is a schematic arrangement diagram of a second metal pattern in the method of manufacturing the mini-LED backlight module according to the embodiment of the present application.
FIG. 6(b) is a schematic arrangement diagram of connection holes in the method of manufacturing the mini-LED backlight module according to the embodiment of the present application.
FIG. 6(c) is a schematic arrangement diagram of a first metal pattern in the method of manufacturing the mini-LED backlight module according to the embodiment of the present application.
Figure 6:
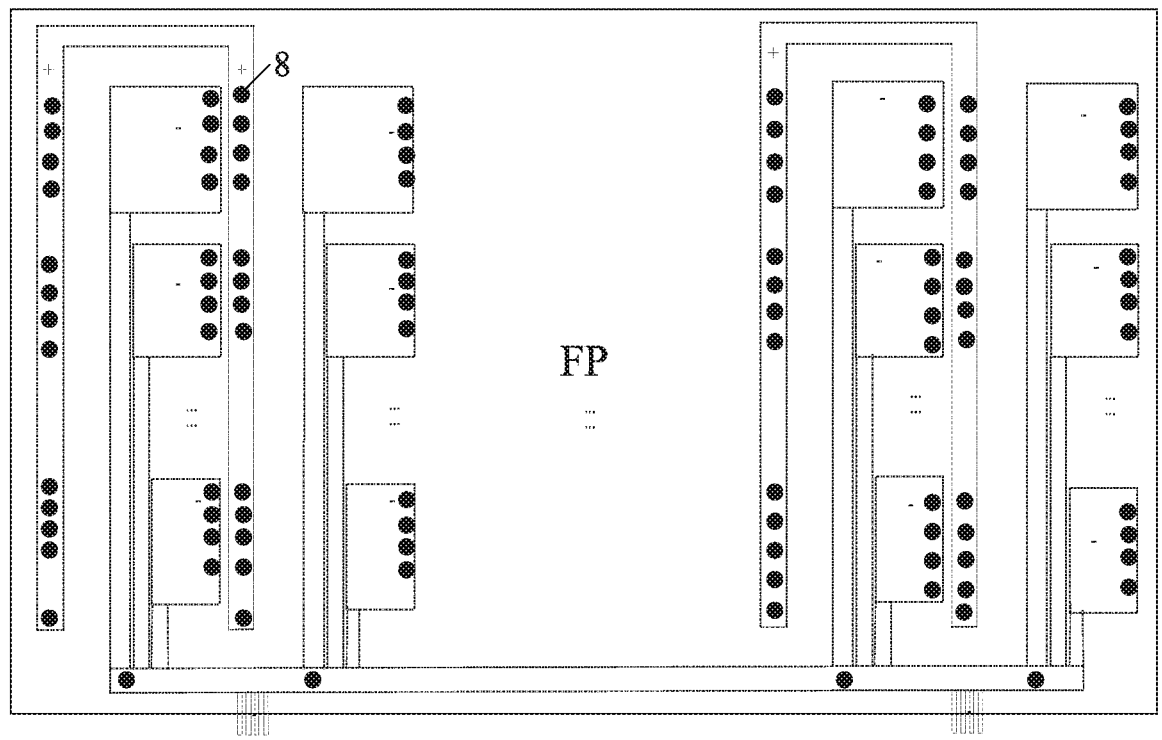
Figure 6:
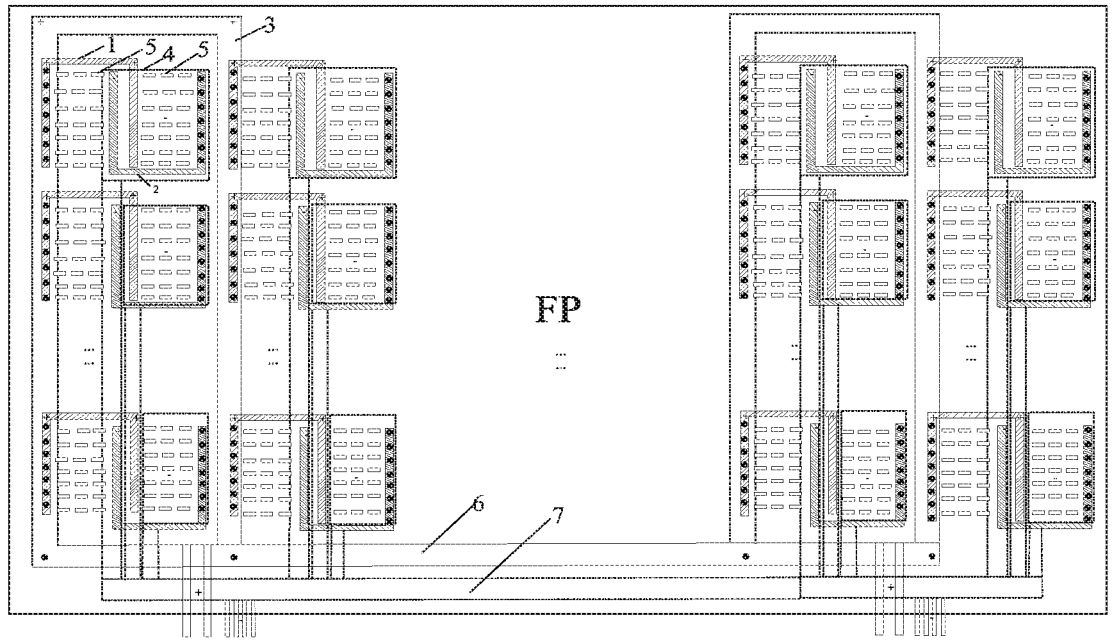

FIG. 6(a) is a schematic arrangement diagram of the second metal pattern in the method of manufacturing the mini-LED backlight module according to the embodiment of the present application, that is, FIG. 6(a) reflects distribution positions of the backlight sub-regions of the backlight partitions 9, the second anode trace 3 and the second cathode trace 4 of the metal pattern. Referring to FIG. 6(a), a plurality of backlight partitions 9 are arranged on the flexible substrate, and the second anode trace 3 and the second cathode trace 4 are arranged at corresponding positions of each of the backlight sub-region of each of the backlight partitions 9. The cathode bus line 7 is arranged at a corresponding position of the flexible substrate, and the second cathode trace 4 is directly electrically connected to the cathode bus line 7.

FIG. 6(b) is a schematic arrangement diagram of connection holes in the method of manufacturing the mini-LED backlight module according to the embodiment of the present application. Referring to FIG. 6(b), a plurality of connection holes are defined on the second anode trace 3 and the second cathode trace 4, that is, at an junction of the second anode trace 3 and the first anode trace 1, and at an junction of the second cathode trace 4 and the first cathode trace 2 are defined with the connection holes 8. The second anode trace 3 is electrically connected to the first anode trace 1 through the connection holes 8, and the second cathode trace 4 is electrically connected to the first cathode trace 2 through the connection holes 8.

FIG. 6(c) is a schematic arrangement diagram of a first metal pattern in the method of manufacturing the mini-LED backlight module according to the embodiment of the present application, that is, FIG. 6(c) reflects a distribution position of the first anode trace 1 and the first cathode trace 2. Referring to FIG. 6(c), the first anode trace 1 and the first cathode trace 2 are arranged at corresponding positions of each of the backlight sub-region of each of the backlight partitions 9. The first anode trace 1 is of an inverted U-shape, and the second cathode trace 2 is of a U-shape, the first anode trace 1 and the first cathode trace 2, that is, a leg portion of the inverted U-shaped first anode trace 1 and a leg portion of the U-shaped first cathode trace 3 arranged close to each other are positioned inside U-shaped recesses of each other, respectively. The anode bus line 6 is arranged at a corresponding position of the flexible substrate, and the second anode trace 3 and the anode bus line 6 are electrically connected through the connection holes 8.

Referring to FIG. 3, in the first backlight sub-region and the second backlight sub-region, respectively, the first mini-LED in each row of n mini-LEDs is electrically connected to the first anode trace 1, and the n-th mini-LED is electrically connected to the first cathode trace 2; and n mini-LEDs in a same row are connected in series to form a series branch, and m series branches are connected in parallel to form a parallel module. Thus, the mini-LEDs arranged in an array of m rows by n columns are arranged in each of the backlight sub-region.

It should be noted that a specific process of the method of manufacturing the mini-LED backlight module described above with respect to FIG. 3 and FIG. 4 corresponds to one specific arrangement of the mini-LED backlight module in FIG. 3 and FIG. 4, and steps of the specific process can be swapped back and forth according to actual conditions in order to facilitate implementation of the manufacturing process, where the order of the steps for the specific process is not limited.

Figure 7:
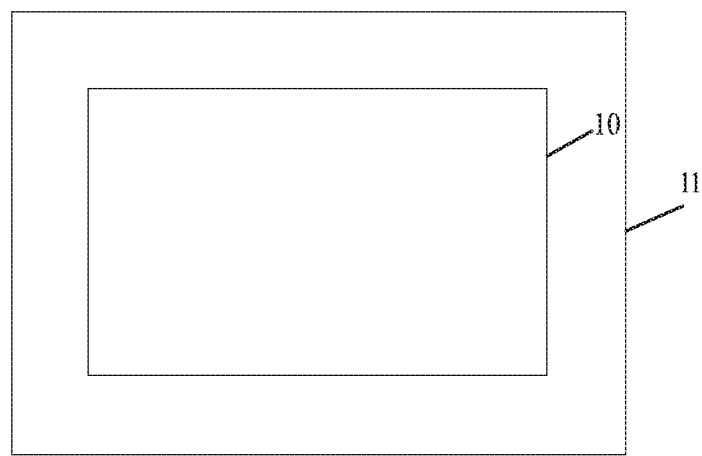
FIG. 7 is a schematic structural diagram of a display panel according to an embodiment of the present application.

FIG. 7 is a schematic structural diagram of a display panel according to an embodiment of the present application. Referring to FIG. 7, an embodiment of the present application further provides a display panel 11 including the mini-LED backlight module 10 as described above. The display panel 11 and the mini-LED backlight module 10 have a same structure and beneficial effects. The foregoing embodiments have described the structure and beneficial effects of the mini-LED backlight module 10, and will not be repeated here.

It can be understood that for those of ordinary skill in the art, equivalent replacements or changes can be made according to the technical solutions of the present application and its inventive concept, and all of these changes or replacements shall fall within the protection scope of the appended claims of the present application.

What is claimed is:

1. A mini light-emitting diode (mini-LED) backlight module, comprising a flexible substrate, and a first metal pattern and a plurality of mini-LEDs arranged on the flexible substrate, wherein the flexible substrate is provided with a plurality of backlight partitions, the first metal pattern is defined into a plurality of first sub-metal patterns, and each of the first sub-metal patterns is arranged corresponding to one of the backlight partitions;

wherein each of the backlight partitions comprises at least one backlight sub-region, and each of the backlight sub-regions is provided with a plurality of the mini-LEDs arranged in an array;

wherein in each of the backlight sub-regions, all of the mini LEDs positioned in a same row are connected in series to form a series branch, and multiple series branches are connected in parallel to form a parallel module; and wherein some of the parallel modules are electrically connected through the first sub-metal patterns to enable an external input signal to be input to each of the mini-LEDs in the backlight sub-regions through each of the first sub-metal patterns.

2. The mini-LED backlight module according to claim 1, wherein each of the first sub-metal patterns comprises a first anode trace and a first cathode trace, and both ends of the parallel module are electrically connected to the first anode trace and the first cathode trace, respectively.

3. The mini-LED backlight module according to claim 2, wherein each of the first sub-metal patterns further comprises a plurality of connection lines, and all of the mini-LEDs in each of the series branches are connected in series through the connection lines.

4. The mini-LED backlight module according to claim 2, wherein each of the backlight partitions comprises one of the backlight sub-regions, and the first anode trace and the first cathode trace are straight traces, and are respectively distributed on both sides of each of the backlight partitions.

5. The mini-LED backlight module according to claim 2, wherein each of the backlight partitions comprises two of the backlight sub-regions, the two of the backlight sub-regions are arranged side by side, and the both ends of the parallel module of each of the backlight partitions are electrically connected to the first anode trace and the first cathode trace, respectively.

6. The mini-LED backlight module according to claim 5, wherein the two of the backlight sub-regions are a first backlight sub-region and a second backlight sub-region;

the first anode trace is of an inverted U-shape, the first cathode trace is of a U-shape, the first anode trace is arranged around the mini-LEDs positioned in the first backlight sub-region, and the first cathode trace is arranged around the mini-LEDs positioned in the second backlight sub-region;

the first anode trace and the first cathode trace are arranged alternately, and a portion where the first anode trace and the first cathode trace are close to each other is positioned between the first backlight sub-region and the second backlight sub-region; and the both ends of the parallel module in the first backlight sub-region and the second backlight sub-region are electrically connected to the first anode and the first cathode nearby, respectively.

7. The mini-LED backlight module according to claim 2, wherein a second metal pattern is further provided on the flexible substrate, the second metal pattern comprises a plurality of second sub-metal patterns, each of the second sub-metal patterns is arranged corresponding to one of the backlight partitions, and each of the second sub-metal patterns comprises a second anode trace and a second cathode trace;

wherein the first anode trace of one of the first sub-metal patterns is electrically connected to a corresponding second anode trace of one of the second sub-metal patterns, and the first cathode trace of the one of the first sub-metal patterns is electrically connected to a corresponding second cathode trace of the one of the second sub-metal patterns.

8. The mini-LED backlight module according to claim 7, wherein the first metal pattern further comprises an anode bus line, the second metal pattern further comprises a cathode bus line, each of the second anode trace of each of the second sub-metal patterns is electrically connected to the anode bus line, and each of the second cathode trace of each of the second sub-metal patterns is electrically connected to the cathode bus line.

9. The mini-LED backlight module according to claim 7, wherein the second metal pattern and the first metal pattern are arranged in different layers.

10. The mini-LED backlight module according to claim 9, wherein the second metal pattern is positioned under the first metal pattern.

11. A display panel, comprising the mini-LED backlight module according to claim 1.

12. A method of manufacturing the mini light-emitting diode (mini-LED) backlight module, comprising following steps:

providing a flexible substrate, defining the flexible substrate into a plurality of backlight partitions, wherein each of the backlight partitions comprises at least one backlight sub-region;

forming a first metal pattern on the flexible substrate, wherein the first metal pattern is defined into a plurality of first sub-metal patterns, and each of the first sub-metal patterns is arranged corresponding to one of the backlight partitions; and, mounting a plurality of mini-LEDs correspondingly on the flexible substrate, wherein the mini-LEDs positioned on each of the at least one backlight sub-region are arranged in an array;

wherein in each of the backlight sub-region, all of the mini-LEDs positioned in a same row are connected in series to form a series branch, multiple series branches are connected in parallel to form a parallel module, and a plurality of the parallel modules are electrically connected through the first sub-metal patterns to enable an external input signal to be input to each of the mini-LEDs in the backlight sub-regions through each of the first sub-metal patterns.

13. The method of manufacturing the mini-LED backlight module according to claim 12, wherein each of the first sub-metal patterns comprises a first anode trace and a first cathode trace, and both ends of the parallel module are electrically connected to the first anode trace and the first cathode trace, respectively.

14. The method of manufacturing the mini-LED backlight module according to claim 13, wherein each of the first sub-metal patterns further comprises a plurality of connection lines, and all of the mini-LEDs in each of the series branches are connected in series through the connection lines.

15. The method of manufacturing the mini-LED backlight module according to claim 13, wherein each of the backlight partitions comprises one of the backlight sub-region, and the first anode trace and the first cathode trace are straight traces, and are respectively distributed on both sides of each of the backlight partitions.

16. The manufacturing method of the mini-LED backlight module according to claim 13, wherein each of the backlight partitions comprises two of the backlight sub-regions, the two of the backlight sub-regions are arranged side by side, and the both ends of the parallel module of each of the backlight partitions are electrically connected to the first anode trace and the first cathode trace, respectively.

17. The method of manufacturing the mini-LED backlight module according to claim 16, wherein the two of the backlight sub-regions are a first backlight sub-region and a second backlight sub-region;

the first anode trace is of an inverted U-shape, the first cathode trace is of a U-shape, the first anode trace is arranged around the mini-LEDs positioned in the first backlight sub-region, and the first cathode trace is arranged around the mini-LEDs positioned in the second backlight sub-region;

the first anode trace and the first cathode trace are arranged alternately, and a portion where the first anode trace and the first cathode trace are close to each other is positioned between the first backlight sub-region and the second backlight sub-region; and the both ends of the parallel module in the first backlight sub-region and the second backlight sub-region are electrically connected to the first anode and the first cathode nearby, respectively.

18. The method of manufacturing the mini-LED backlight module according to claim 13, wherein before the step of forming the first metal pattern on the flexible substrate, the method of manufacturing the mini-LED backlight module further comprises following step:

disposing a second metal pattern on the flexible substrate, wherein the second metal pattern is defined into a plurality of second sub-metal patterns to make each of the second sub-metal patterns arranged corresponding to one of the backlight partitions; and wherein each of the second sub-metal patterns comprises a second anode trace and a second cathode trace, the first anode trace of one of the first sub-metal patterns is electrically connected to a corresponding second anode trace of one of the second sub-metal patterns, and the first cathode trace of the one of the first sub-metal patterns is electrically connected to a corresponding second cathode trace of the one of the second sub-metal patterns.

19. The method of manufacturing the mini-LED backlight module according to claim 18, wherein the first metal pattern further comprises an anode bus line, the second metal pattern further comprises a cathode bus line, each of the second anode trace of each of the second sub-metal patterns is electrically connected to the anode bus line, and each of the second cathode trace of each of the second sub-metal patterns is electrically connected to the cathode bus line.

* * * * *